E. S. WOODS.
ANTIFRICTION CENTER BEARING.
APPLICATION FILED SEPT. 3, 1907.
995,835.
Patented June 20, 1911.
2 SHEETS—SHEET 1.
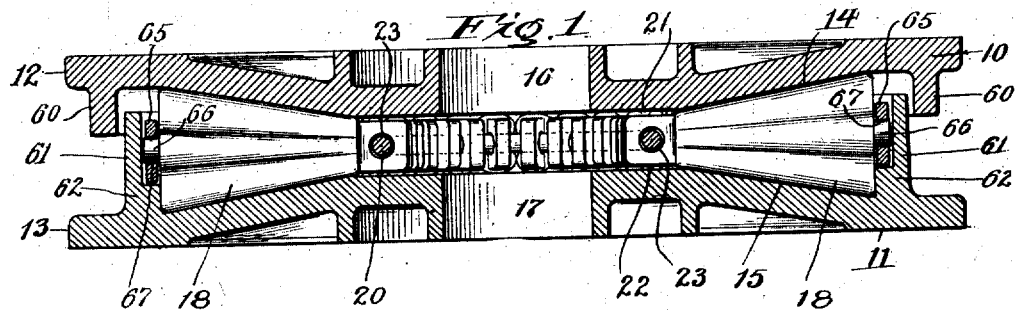
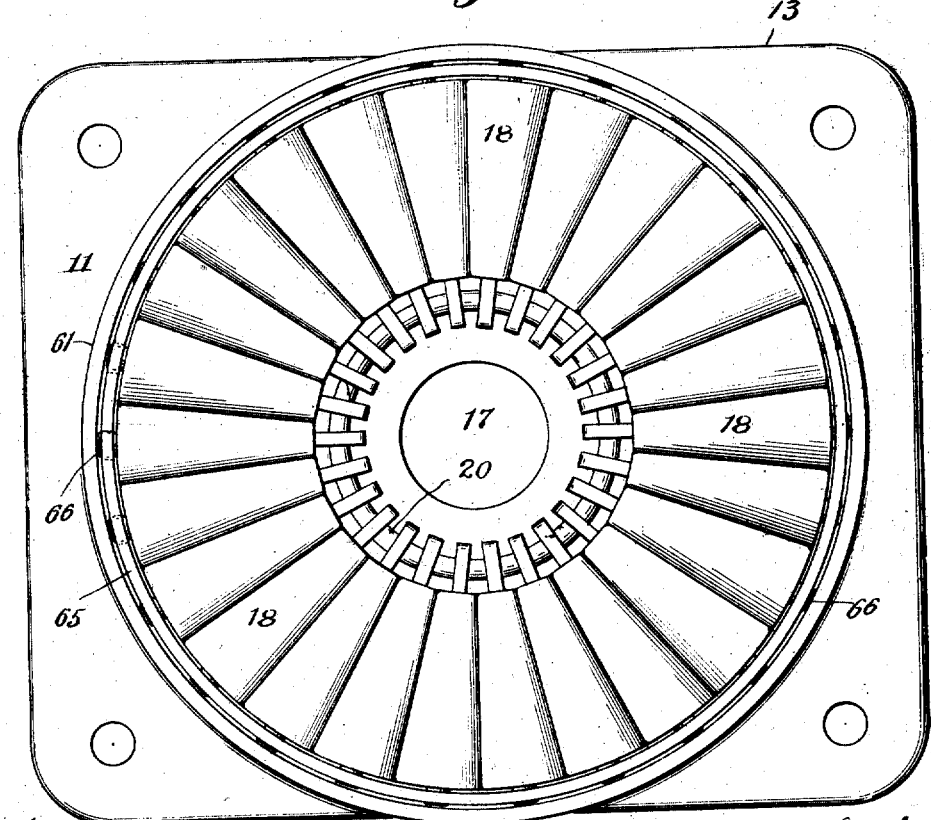

E. S. WOODS.
ANTIFRICTION CENTER BEARING.
APPLICATION FILED SEPT. 3, 1907.
995,835.  Patented June 20, 1911.
2 SHEETS—SHEET 2.
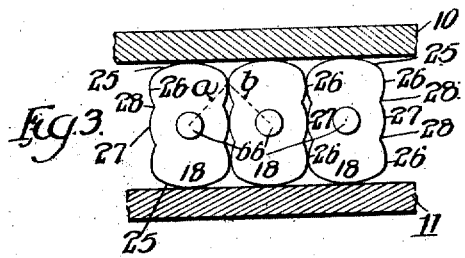
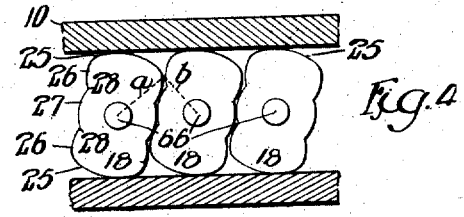
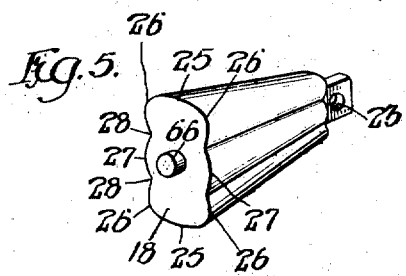
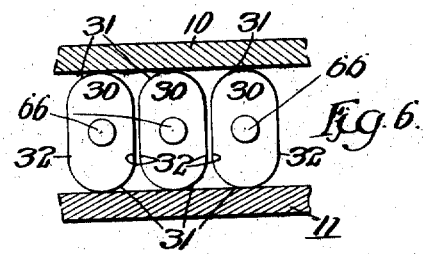
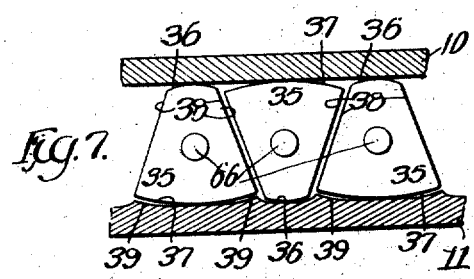
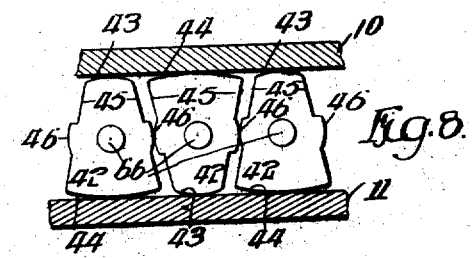
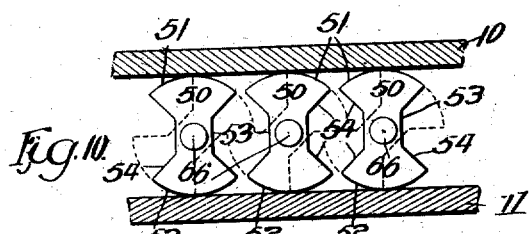
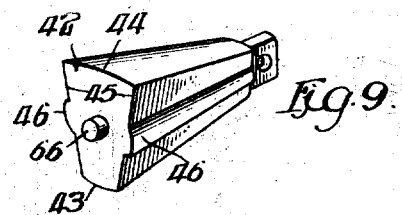
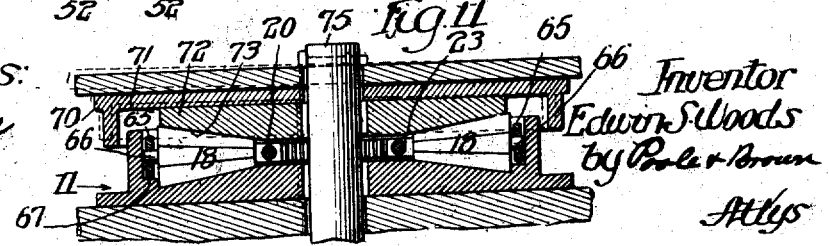

UNITED STATES PATENT OFFICE.

EDWIN S. WOODS, OF CHICAGO, ILLINOIS.

ANTIFRICTION CENTER-BEARING.

995,835.  Specification of Letters Patent.  Patented June 20, 1911.

Application filed September 3, 1907. Serial No. 391,039.

*To all whom it may concern:*

Be it known that I, EDWIN S. WOODS, a citizen of the United States, and a resident of Chicago, in the county of Cook and State of Illinois, have invented certain new and useful Improvements in Antifriction Center-Bearings; and I do hereby declare that the following is a full, clear, and exact description thereof, reference being had to the accompanying drawings, and to the letters of reference marked thereon, which form a part of this specification.

This invention relates to improvements in antifriction bearings designed to be interposed between two parts, which are arranged in substantially parallel relation with each other, and which are capable of limited relative oscillatory movement, in order to transmit a load from one of said parts to the other in such manner as to minimize the friction between the same in the relative oscillation of said parts.

My improved antifriction bearing is particularly adapted for use as a center bearing between the truck and body bolster of a railway car and in analogous situations, and is herein illustrated and is specifically described as applied to that use, though it will be understood that certain features of my device may be applied to other uses.

Heretofore bearings of this nature have generally been provided with antifriction elements, such as cones, balls or other forms of rollers having annular bearing surfaces for rolling contact with the upper and lower members between which they are placed, so that they are individually adapted for complete rotation upon extended turning movement of one of said members relatively to the other. The antifriction elements or rollers of such bearings have been usually placed in as close relation to each other as their circular cross-sectional form permitted, in order to obtain a maximum carrying capacity in the bearing. These bearings have proved unsatisfactory for sustaining a heavy load such, for example, as is carried by the center plates on the body and truck of a modern railroad car, where both the diameter of the center plates and the available height are restricted by the fixed condition of prevailing car designs.

The relative horizontal oscillation of car center plates is comparatively limited, seldom exceeding 15 degrees of arc, even in the case of long passenger cars. This relative oscillatory movement of the center plates would cause an antifriction element, for example, one of $2\frac{1}{2}$ inches diameter, at 6 inches from the axis of the center plates, to turn through an arc equal to but about $\frac{1}{10}$ of its circumference, which would represent its greatest amplitude of oscillatory movement. It is usually desirable to use antifriction elements of the greatest permissible radial dimension or height, as the carrying capacity of the individual elements increases with their height or effective diameter. Considering a cross-section of an antifriction element through its bearing or contact surface, taken in a plane at right angles to its axis of oscillation, it will be apparent that those parts of said section which lie laterally without the space included or inclosed between the upper and lower arcs on which said section rolls during an oscillation of the greatest required amplitude and approximately straight lines connecting the ends of said arcs, perform no function in load transmission, and are therefore useless. It follows that the part of the cross-section of the antifriction element included by or within the upper and lower arcs on which said section rolls during an oscillation of the greatest required amplitude and defined laterally by right lines connecting the ends of the said arcs, (and which forms in effect the area of load transmission), may properly be termed the section of transmission, and I will so refer to it throughout my specification and claims.

A principal feature of my invention consists in so forming and arranging the antifriction elements that each element in the form of its cross-section taken through its bearing or contact surfaces in a plane perpendicular to its axis of oscillation, corresponds substantially with its section of transmission and each element is placed in close relation with the antifriction elements at either side of it, thus multiplying the sustaining capacity of the bearing by the ratio, which the height of the section of transmission bears to the width thereof, as compared with one of the prior bearings above referred to, the antifriction elements of which are of like height or of like radial dimension as to its contact or bearing surfaces. This I accomplish by omitting a portion or all of the material of each element which lies without the section of transmission, and spacing the elements as closely together as possible, while leaving each element free to rock or oscillate to an adequate extent. In some cases, a part of the material which lies within the section of transmission, as above defined, may also be omitted, particularly that part, the removal of which will not materially lessen the strength of the antifriction element.

The antifriction elements in a bearing embodying my invention are characterized by features of construction, shape and relation which may be stated in general terms as follows: Said antifriction elements are arranged between said bearing members in circular order with the horizontal axes, on which they turn or oscillate in their rocking movement, located between the bearing members and, in the case of a center bearing, with said axes radial to a common vertical axis which coincides with the axis of oscillation of the upper and lower bearing members. Each antifriction element has top and bottom bearing surfaces for contact with bearing surfaces on the upper and lower bearing members, the co-acting bearing surfaces in the antifriction elements and the bearing members being relatively so shaped or formed as to afford rolling movement of each antifriction element on each of the two bearing members, and rocking movement of the antifriction elements themselves, when the upper and lower bearing members are relatively turned or oscillated, while maintaining constant the vertical distance between the upper and lower bearing members. Each antifriction element is flattened or cut away at its sides, so that its width is substantially less than its height; its form in cross-section, taken through its bearing surfaces and at right angles to its axis of oscillation, approximating the section of transmission hereinbefore referred to.

The antifriction elements may be greatly varied in their general form or shape, provided it be such as to permit them to be nested closely together, while at the same time admitting of ample rocking or oscillating movement thereof to provide for the necessary relative oscillatory movement of the upper and lower bearing members, without such contact of said antifriction elements with each other, as would result in the jamming or locking of said antifriction elements. By the use of these features of construction I am enabled to largely increase the number of antifriction elements associated with bearing-plates of a given diameter, and to thereby correspondingly increase the carrying capacity of the bearing as compared with prior bearings having antifriction elements which are circular in cross-sectional form and individually equal in load-carrying capacity to those of my improved bearing.

It will thus be seen that I have devised an antifriction bearing, which, when applied to the center plates of railway cars, for example, permits of supporting within given limits of diameter and height, loads of from two to three times the magnitude which it has heretofore been possible to sustain; and this for the reason that my invention permits of inclosing within given limits of diameter and height, antifriction elements possessing from two to three times as much load-carrying capacity as has heretofore been possible.

In the accompanying drawings:—Figure 1 is an axial vertical section of a center bearing embodying my invention. Fig. 2 is a top plan view thereof with the upper member or body bolster plate removed. Fig. 3 is an end view showing a plurality of adjacent antifriction elements used in the construction shown in Figs. 1 and 2. Fig. 4 is a like view showing the antifriction elements in changed positions. Fig. 5 is a perspective view of one of the antifriction elements removed from the other parts. Fig. 6 is an end elevation showing a modified form of antifriction element. Fig. 7 is a like view of a further modification. Fig. 8 is a like view showing a still further modification. Fig. 9 is a perspective view of the antifriction element shown in Fig. 8. Fig. 10 is an end elevation of a plurality of bearing elements of another form. Fig. 11 is an axial vertical section of a modified form of bearing, embracing a two-part cover or top member.

As shown in said drawings, 10 designates the upper member and 11 the lower member of a car center bearing, these parts being preferably made of cast metal. Said upper and lower bearing members are provided with apertured marginal flanges 12 and 13, and are adapted to be secured to the body and truck bolsters (not shown) by bolts or rivets extending through the apertures of said flanges. The said members are shaped to form between them a chamber to receive the antifriction bearing elements through the medium of which the load is transmitted from the upper to the lower bearing member. Said chamber is annular in form and the upper and lower walls thereof, formed on the lower surface of the upper member and the upper surface of the lower member, respectively, constitute bearing surfaces 14 and 15 with which the upper and lower bearing faces of the antifriction elements have rolling contact or engagement. The said upper and lower bearing members are also provided with vertically alined central openings 16 and 17, respectively, to receive the usual king-pin or bolt that connects the body bolster with the truck bolster.

In the accompanying drawings are shown some of the forms of antifriction elements in which the features hereinbefore set forth may be embodied in practice; all of the forms illustrated embracing, in common, the following features: The top and bottom bearing surfaces of said antifriction elements are transversely curved, with a convex curvature, and such convexly curved surfaces are extended in the direction of the axis of oscillation of the antifriction elements, or radially of the bearing plate center, so as to afford bearing contact of the antifriction members against the bearing members on lines radial to the central, vertical axis of the said bearing members, while the flattened or cut away sides of said antifriction elements converge inwardly toward the said vertical axis, so that the side faces of adjacent elements are substantially parallel with each other. The elements thus made are arranged in such closely spaced relation as to be in contact laterally with each other, so that each element tends to hold the others in operative position, and oscillatory movement may be transmitted from one element to the other of the series. Moreover, the flattened or cut away sides of the antifriction elements are so spaced as to provide movement-limiting stop surfaces to restrict the total extent of rocking or oscillatory movement thereof. In the specific example illustrated by the drawings, said antifriction elements are elongated radially, or in the direction of their axes of oscillation, while their convexly curved bearing surfaces are uniformly tapered inwardly or toward the central axis of the bearing plates, so that they have the form of conical segments, while the bearing or contact faces 14 and 15 of the bearing plates are uniformly inclined or of conical form, and correspond in inclination with the inclination or taper of the top and bottom bearing surfaces of the antifriction elements. The close nested arrangement of the antifriction elements, which is rendered possible by giving them the cross-sectional form described, is of great importance inasmuch as it in all cases decreases the load on each antifriction element as compared with existing bearings of this character employing rolling elements having annular bearing or contact surfaces, and greatly reduces the outward end thrust of individual elements, if their bearing surfaces have the form of conical elements.

Referring now to the form of antifriction elements illustrated in Figs. 1 and 2, and shown in detail in Figs. 3, 4 and 5, the antifriction elements, designated by the reference character 18 are adapted for use with the particular form of bearing plates, having bearing faces 14 and 15 of conical shape, illustrated in Figs. 1 and 11, and are characterized, in addition to the general features hereinbefore referred to, by the following features of construction: Each of said antifriction elements has upper and lower bearing surfaces 25, 25 which, considered with respect to a cross-section of the element taken in a plane perpendicular to the axis of rotation of the element is arc-shaped or transversely curved with a convex curvature, and the curves of which have a common center lying within the cross-section of the element. Longitudinally of the element said bearing surfaces are inclined relatively to the axis of rotation of the element, with uniform inclination, so that each bearing surface has the form of a conical segment, tapering toward the inner end of the element. In this particular form of antifriction element, therefore, the bearing surfaces thereof have contact with the inclined bearing faces 14 and 15, of the members 10 and 11, in straight radial lines, as in the case of conical rollers interposed between like bearing members. The flattened sides of said antifriction elements are fashioned to provide three longitudinally disposed, transversely convex, lateral surfaces 26, 27, and two intermediate longitudinally disposed, transversely concave surfaces 28, 28. When the antifriction elements are in their normal or central positions, as shown in Fig. 3, the convex surfaces of one engage the corresponding convex surfaces of contiguous antifriction elements, thus admitting of a close spacing or nesting thereof, and limited areas of contact. Moreover, the contour of the side faces of said antifriction elements 18 is such that said faces constitute, when the elements assume their greatest inclination from their normal or central position, stops for arresting the further movement of said antifriction elements, as shown in Fig. 4. It will be evident that the flattening or cutting away of the sides of the antifriction elements reduces the distance from the lines of contact between adjacent antifriction elements and the axes of oscillation thereof, as compared with a roller which is circular in cross-sectional form.

As shown in Fig. 6 the cross-sectional form of the antifrictional elements 3 is defined by convexly curved lines, which indicate the transverse curvature of the upper and lower bearing surfaces 31, 31, and said lines are joined by straight lines, which indicate the side faces 32, 32 of said elements. The latter construction admits of a somewhat closer spacing of the antifriction elements and a larger increase of bearing contact as compared with the first described construction.

In the construction shown in Fig. 7, the antifriction elements 35 are generally triangular in cross-sectional form. In this instance each element has a transversely curved short bearing surface 36 and a transversely curved longer bearing surface 37. These bearing surfaces are joined by diverging side surfaces 38, 38. The antifriction elements of this cross-sectional form are designed to be arranged in alternate relation, with the short bearing surface 36 of one facing in the same direction as the longer bearing surface 37 of an adjacent antifriction element. In this construction, therefore, a portion of each antifriction element extends in all positions of the elements within the projected plan of the next adjacent antifriction element. This arrangement of the antifriction elements admits close spacing to bring their sections of transmission close together, while preserving an antifriction element of ample mass and strength, and also admits of ample rocking or rolling movement of said antifriction elements, without jamming or binding of the same in their extreme positions of oscillation. In connection with antifriction elements having this cross-sectional form, as well as the others described, one of the bearing members, in the instance shown, the lower member 11, may have its contact or bearing surface 39 for each antifriction element transversely curved and of concave form, thereby forming a series of shallow recesses or depressions in the bearing member; the radially extending ribs or projections between such shallow recesses, serving to prevent lateral shifting of the antifriction elements.

In Figs. 8 and 9 I have shown a modification of the cross-sectional form of antifriction element illustrated in Fig. 7, applied to an elongated and uniformly tapered antifriction element such as is shown in Figs. 1 to 5. In this instance, the bearing surfaces, in contact between adjacent antifriction elements, are of very small or limited area. As shown in said figures, 42, 42 designate the antifriction elements, each having a transversely short curved bearing surface 43 and a transversely longer curved bearing surface 44, joined by generally flattened oblique side faces 45, 45. The side faces of said antifriction elements are formed with longitudinally disposed ribs or elevations forming transversely convex surfaces 46, the ribs on adjacent elements being adapted for contact with each other.

In Fig. 10 is shown an antifriction element in cross-sectional form corresponding generally with that illustrated in Figs. 1 to 6, inclusive. As shown in said Fig. 10, said antifriction elements are designated by the reference character 50 and are provided with upper and lower transversely curved bearing surfaces 51, 52, which are joined by side faces, each in its cross-sectional form comprising a central portion 55 defined by parallel, straight lines, and portions 54, 54 which are defined by oblique lines and meet the upper and lower bearing surfaces 51, 52. In this cross-sectional form, the central portion of the antifriction element is made laterally narrow, while the upper and lower sides flare outwardly from said narrow central portion to their intersection with the upper and lower transversely curved surfaces. When said antifriction elements 50 are swung to their maximum throw, the oblique lateral surfaces 54, 54 of the contiguous faces of the adjacent elements come in contact with each other, and constitute stops acting to limit the total throw of said antifriction elements, in the manner indicated in dotted lines in Fig. 10. In this construction, as in that shown in Figs. 3 and 4, the adjacent antifriction elements are adapted for meshing engagement with each other at their sides, a projecting part of one being arranged to enter or mesh with a recessed part of another to limit the movement thereof, and also to hold each antifriction element in operative position relatively to the bearing members, by engagement with an adjacent antifriction element.

In the case of all of the several illustrations, Figs. 3, 4, 6, 7, 8 and 10, showing the forms of the antifriction elements in cross-section taken at right angles to their axes of oscillation, it is to be observed that the bearing surfaces of said elements, adapted for rolling contact with the bearing members 10 and 11, need not necessarily have the form of conical segments (as is the case with the particular construction shown in Figs. 1, 2, 5, 9 and 11), but may be of other desired or preferred form, and may be adapted to operate in connection with bearing plates or members having bearing faces for contact with the antifriction elements of other than the uniformly inclined or conical form illustrated. As, for instance, in the case of the forms illustrated in Figs. 1, 2, 5, 9 and 11, the taper or convergence of the bearing faces of the antifriction element is uniform and the co-acting contact surfaces of the bearing members are uniformly inclined or of conical form, so that the lines of contact between the parts are both radial and straight, but it is manifestly not essential either that the said bearing surfaces of the antifriction elements should be uniformly tapered or that the bearing members should have uniformly inclined or conical bearing surfaces, or that the antifriction elements should have radially extended or line contact with said bearing faces of the bearing members; the only essential feature of my invention, in its broader aspect, residing in the form of the antifriction element, considered with respect to the cross-section of the same, taken on a plane perpendicular to its axis of oscillation and passing through the bearing surfaces of the antifriction elements that are in rolling contact with the upper and lower bearing members; it being manifest that the improved results stated are due to such cross-sectional form of the said antifriction elements, and are not necessarily dependent on the form given said elements in other respects.

It will be observed that in all of the forms of antifriction elements shown, the cross-sectional shape is such that each antifriction element is adapted to extend into the plan, projected on a horizontal plane, of the next adjacent antifriction element. Such relation of the antifriction elements is shown in Figs. 7, 8 and 9, as the normal relation thereof and is maintained in all positions of the antifriction elements. In the construction shown in the other figures this relation exists when the antifriction elements are rocked or oscillated from their central or neutral positions.

It will be observed that the carrying capacity of the bearing embodying my invention is increased as compared with that of a bearing employing antifriction elements having circular bearing surfaces, for rolling contact with the bearing members, of the same radial dimensions. It will be furthermore observed that all of the antifriction elements or rockers constituting the annular series are arranged in uniform relation to each other, whereby said antifriction elements act mutually upon each other in such manner as to hold them in operative position and maintain them always in their normal parallel relation. Said antifriction elements may be made of other forms than those herein illustrated, so long as the essential laws of their structure and operation are observed, to provide a substantially increased bearing capacity within the limited space available, as compared with antifriction elements of full circular and like cross-section.

The term "flattened" or "cut away" as herein employed is intended to cover broadly all of the forms of antifriction elements herein illustrated, as well as others which operate on the general principle herein disclosed and set forth in the claims, and in which the cross-sectional form of the antifriction element corresponds with its section of transmission, regardless of the particular shape of their side faces, and regardless of the shape in other respects of the elements as a whole or of the bearing or contact surfaces thereof.

As shown in Figs. 1, 2, 5, 9 and 11, devices are shown for loosely holding or retaining the antifriction elements in place as follows: Said antifriction elements are loosely connected at their inner ends with a retaining ring 20 which surrounds the central openings of the upper and lower bearing members and occupies the space between the upper and lower parallel faces 21, 22 of said members, radially inside of the inclined or conical bearing surfaces of said members. For this purpose, said inner ends of the antifriction elements are reduced in cross-section and are provided with apertures 23 through which are inserted a rod which forms said retaining ring, the rod having itse ends joined or secured together in any suitable manner. As shown in Figs. 1 and 11, the upper and lower members 10 and 11 of the bearing are provided with overlapping annular flanges 60, 61, respectively, the flange 60 of the upper member fitting outside of the flange of the lower member. The flange of the lower member is thickened at its lower side adjacent to the lower bearing surface 15 to constitute an inwardly facing annular thrust shoulder 62 that is designed for contact with the larger ends of the antifriction elements to receive the end thrust of said antifriction elements due to their conical form and their positions between the oblique bearing surfaces of the upper and lower bearing members. The single thrust shoulder 62 is made relatively narrow and extends a distance over the ends of the antifriction elements and terminates short of the centers of said ends or the axes of the antifriction elements so as to decrease the bearing contact between said parts under the oscillating action of the antifriction elements and to prevent, to an extent, any tendency of the antifriction elements to get out of radial position and therefore to bind. The shortening of the annular thrust shoulder in this manner decreases the resistance offered to the turning of the antifriction elements by diminishing the friction due to the turning motion. As shown in these figures of the drawings, moreover, a spacing ring 65, is located between the marginal parts of the bearing members and surrounds the outer ends of the antifriction elements, and said antifriction elements are provided with trunnions or pivot studs 66, (shown in Figs. 5 and 9), which enter suitably spaced apertures in said ring.

In the construction shown in Fig. 11, I have shown a form of bearing wherein the upper bearing member, designated as a whole by the reference character 70, is made of two parts, to wit,—an upper or outer part 71, and an inner or lower part 72. The part 71 of the upper member is designed to be fastened to the body bolster in the same manner as is the upper member 10 of the construction shown in Fig. 1. The lower part 72 of said upper member fits loosely between the said upper part 71 and the antifriction elements and is formed on its lower side to provide a downwardly facing inclined bearing surface 73 for contact with said antifriction elements. Said lower part 72 of the upper bearing member or cover constitutes in effect a floating member, the movement of which need not follow the total movement of said upper member or cover. Thus the said lower part of the upper member may travel with the antifriction elements until the latter are locked from further oscillation, after which the upper part of said upper member may rotate with a sliding friction against the lower part thereof.

In the construction illustrated in the accompanying drawings, the upper and lower members of the bearing are so arranged relatively to each other and to the centrally located king-pin, that said parts may have such freedom of movement as to permit a slight lateral shifting of the upper member from its normally parallel relation to the lower member, due to the tipping of the bolster, allowed by clearance between the body and truck side bearings, while, at the same time, maintaining good contact of the bearing parts. Thus in Fig. 11, the full lines show the normal position of the upper member, while the dotted lines show the position thereof after the bolster has tipped slightly, in the manner indicated. This is effected by providing clearance between the marginal parts of the upper and lower members of the bearing and between said upper member and the king-pin or bolt 75 which extends through the central openings of said bearing members.

I claim as my invention:—

1. An antifriction bearing comprising relatively oscillatory bearing members and an interposed series of closely spaced, radially disposed, antifriction elements, all of which are adapted to oscillate on axes located intermediate said bearing members, the cross-section of each antifriction element taken at right angles to its axis of oscillation, approximating its section of transmission.

2. An antifriction bearing comprising relatively oscillatory bearing members and an interposed series of closely spaced, radially disposed, antifriction elements, all of which are adapted to oscillate on axes located intermediate said bearing members, the cross-section of each antifriction element taken at right angles to its axis of oscillation, being greater in one direction than in a direction at right angles thereto.

3. An antifriction bearing comprising relatively oscillatory bearing members and an interposed series of annularly arranged, closely spaced, antifriction elements, all of which are adapted to oscillate on axes radial to the axis of oscillation of said bearing members, and which have contact at their top and bottom surfaces with said bearing members, the cross-section of each antifriction element taken at right angles to its axis of oscillation, approximating its section of transmission.

4. An antifriction bearing comprising relatively oscillatory bearing members and an interposed series of annularly arranged, closely spaced, antifriction elements, all of which are adapted to oscillate on axes radial to the axis of oscillation of said bearing members, and which have rolling contact at their top and bottom surfaces with said bearing members, the cross-section of each antifriction element, taken at right angles to its axis of oscillation, being of greater height than width.

5. An antifriction bearing comprising relatively oscillatory bearing members and an interposed series of annularly arranged, antifriction elements, all of which are adapted to oscillate on axes radial to the central axis of said bearing members and which have rolling contact at their top and bottom surfaces with said bearing members, the cross-section of each antifriction element, taken at right angles to its axis of oscillation, approximating its section of transmission, each element being adapted to extend into the projected plan of the next adjacent element.

6. An antifriction bearing comprising relatively oscillatory bearing members and an interposed series of annularly arranged, closely spaced, antifriction elements, all of which are adapted to oscillate simultaneously on axes radial to the axis of oscillation of said bearing members and which have rolling contact at their top and bottom surfaces with said bearing members, said antifriction elements being flattened at their side faces, so that the cross-section of each element, taken at right angles to its axis of oscillation, approximates its section of transmission, and the flattened side faces of each element converging toward the center of oscillation of said bearing members.

7. An antifriction bearing comprising relatively oscillatory bearing members and an interposed series of annularly arranged antifriction elements, all of which are adapted to oscillate simultaneously on axes radial to the axis of oscillation of said bearing members and which have rolling contact at their top and bottom surfaces with said bearing members, the cross-section of each antifriction element taken at right angles to its axis of oscillation approximating its section of transmission, and said elements being so closely spaced as to transmit rolling or rocking movement one from the other.

8. An antifriction bearing comprising relatively oscillatory bearing members and an interposed series of annularly arranged antifriction elements, all of which are adapted to oscillate simultaneously on axes radial to the axis of oscillation of said bearing members and which have rolling contact at their top and bottom surfaces with said bearing members, the cross-section of each antifriction element, taken at right angles to its axis of oscillation, approximating its section of transmission and said elements being spaced so closely together that the elements are maintained in operative position by their lateral engagement with each other.

9. An antifriction bearing comprising relatively oscillatory bearing members and an interposed series of annularly arranged antifriction elements, all of which are adapted to oscillate simultaneously on axes radial to the axis of oscillation of said bearing members and which have rolling contact at their top and bottom surfaces with said bearing members, said antifriction elements being flattened at their side faces and the flattened side faces of adjacent antifriction elements being disposed generally parallel with each other.

10. An antifriction bearing comprising relatively oscillatory bearing members and an interposed series of annularly arranged, closely spaced, antifriction elements, all of which are adapted to oscillate simultaneously on axes radial to the axis of oscillation of said bearing members and which have rolling contact at their top and bottom surfaces with said bearing members, the cross-section of each antifriction element taken at right angles to its axis of oscillation approximating its section of transmission, and the side faces of each element being provided with transversely convex bearing surfaces.

11. An antifriction bearing comprising relatively oscillatory bearing members and an interposed series of annularly arranged, closely spaced, antifriction elements, all of which are adapted to oscillate simultaneously on axes radial to the axis of oscillation of said bearing members and which have rolling contact at their top and bottom surfaces with said bearing members, the cross-section of each antifriction element taken at right angles to its axis of oscillation approximating its section of transmission, and said elements being provided at their side faces with stops for limiting the rocking or rolling movement thereof.

12. An antifriction bearing comprising upper and lower relatively oscillatory bearing members and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, the cross-section of each element taken at right angles to its axis of oscillation approximating its section of transmission and each antifriction element being adapted to limit the movement of the next adjacent element.

13. An antifriction bearing comprising relatively oscillatory bearing members and an interposed series of annularly arranged, closely spaced, antifriction elements, all of which are adapted to oscillate simultaneously on axes radial to the axis of oscillation of said bearing members and which have rolling contact at their top and bottom surfaces with said bearing members, the cross-section of each antifriction element taken at right angles to its axis of oscillation approximating its section of transmission, and each element being adapted for meshing engagement at its side face with the side of the next adjacent antifriction element.

14. An antifriction bearing comprising relatively oscillatory bearing members and an interposed series of annularly arranged, closely spaced, antifriction elements, all of which are adapted to oscillate simultaneously on axes radial to the axis of oscillation of said bearing members and which have rolling contact at their top and bottom surfaces with said bearing members, said antifriction elements having a width less than the diameter of a circle whose circumference is tangent to the bearing surface of said members.

15. An antifriction bearing comprising relatively oscillatory bearing members, and an interposed series of annularly arranged, closely spaced, antifriction elements which have rolling contact at their top and bottom surfaces with said bearing members, the cross-section of each antifriction element approximating its section of transmission.

16. An antifriction bearing comprising relatively oscillatory bearing members, and an interposed series of annularly arranged, inwardly tapered, antifriction elements, each adapted to extend into the projected plan of the next adjacent antifriction element.

17. An antifriction bearing comprising relatively oscillatory bearing members, and an interposed series of annularly arranged, inwardly tapered antifriction elements, having their sections of transmission closely approached.

18. An antifriction bearing comprising relatively oscillatory bearing members, and an interposed series of annularly arranged, inwardly tapered, antifriction elements, each provided with top and bottom bearing surfaces for rolling contact with said bearing members and flattened or cut away at its sides, said elements being spaced with their flattened sides close together and parallel with each other.

19. An antifriction bearing comprising relatively oscillatory bearing members, and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, said bearing members being flattened or cut away at their sides to form inwardly converging side faces and means loosely connecting the inner ends of said antifriction elements.

20. An antifriction bearing comprising relatively oscillatory bearing members and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, said antifriction elements having apertures at their inner ends, and a retaining ring extending loosely through said apertures.

21. An antifriction bearing comprising relatively oscillatory bearing members and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, said antifriction elements being flattened or cut away at their sides to form inwardly converging side faces, and means at the outer ends of said elements for spacing the same.

22. An antifriction bearing comprising relatively oscillatory bearing members and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, said antifriction elements being flattened or cut away at their sides to form inwardly converging side faces, said antifriction elements being provided at their outer ends with pivot studs, and an apertured ring surrounding said elements and provided with apertures to receive said studs.

23. An antifriction bearing comprising relatively oscillatory bearing members and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, said antifriction elements being flattened or cut away at their sides to form inwardly converging side faces, means at the outer ends of said elements for spacing the same, and means loosely connecting said antifriction elements at the inner ends thereof.

24. An antifriction bearing comprising relatively oscillatory bearing members, and an interposed series of annularly arranged, closely spaced, antifriction elements, all of which are adapted to oscillate simultaneously on axes radial to the axis of oscillation of the said bearing members, and which have rolling contact at their top and bottom surfaces with said bearing members, one of said bearing members being provided with a plurality of annularly arranged, curved, bearing surfaces spaced to correspond with the antifriction elements and with which the latter are severally engaged.

25. An antifriction bearing comprising relatively oscillatory bearing members, and an interposed series of annularly arranged, closely spaced, antifriction elements, all of which are adapted to oscillate simultaneously on axes radial to the axis of oscillation of said bearing members, and which have rolling contact at their top and bottom surfaces with said bearing members, one of said bearing members being provided with an annularly arranged series of concave depressions or recesses severally engaged by the bearing surfaces of said antifriction elements.

26. An antifriction bearing comprising relatively oscillatory bearing members and an interposed series of closely spaced, radially disposed, antifriction elements, all of which are adapted to oscillate on axes located intermediate said bearing members, the cross-section of each antifriction element taken at right angles to its axis of oscillation being substantially not in excess of its section of transmission.

In testimony, that I claim the foregoing as my invention I affix my signature in the presence of two witnesses, this 24th day of August A. D. 1907.

EDWIN S. WOODS.

Witnesses:
GEORGE R. WILKINS,
A. M. BUNN.